United States Patent
Zhang et al.

(10) Patent No.: US 9,100,090 B2
(45) Date of Patent: Aug. 4, 2015

(54) ACOUSTIC ECHO CANCELLATION (AEC) FOR A CLOSE-COUPLED SPEAKER AND MICROPHONE SYSTEM

(71) Applicant: CSR TECHNOLOGY INC., San Jose, CA (US)

(72) Inventors: Yi Zhang, Rochester Hills, MI (US); Rogerio Guedes Alves, Macomb, MI (US)

(73) Assignee: CSR Technology Inc., San Jose, CA (US)

( * ) Notice: Subject to any disclaimer, the term of this patent is extended or adjusted under 35 U.S.C. 154(b) by 122 days.

(21) Appl. No.: 14/137,561

(22) Filed: Dec. 20, 2013

(65) Prior Publication Data

US 2015/0180536 A1    Jun. 25, 2015

(51) Int. Cl.
*H04B 3/23* (2006.01)
(52) U.S. Cl.
CPC ........................................ *H04B 3/23* (2013.01)
(58) Field of Classification Search
None
See application file for complete search history.

(56) References Cited

U.S. PATENT DOCUMENTS

| | | |
|---|---|---|
| 5,933,495 A | 8/1999 | Oh |
| 7,035,396 B1 | 4/2006 | Ubowski et al. |
| 7,433,463 B2 | 10/2008 | Alves et al. |
| 2005/0157866 A1* | 7/2005 | Marton et al. ........... 379/406.08 |
| 2009/0185695 A1* | 7/2009 | Marton et al. ................... 381/66 |
| 2014/0112467 A1* | 4/2014 | Wyss et al. ............... 379/406.08 |

OTHER PUBLICATIONS

Search Report for Application No. GB1411875.6 mailed on Dec. 1, 2014, 3 pages.
Ansahl et al., "Adaptive acoustic echo cancellation based on FIR and IIR filter banks," ICASSP, vol. 4, pp. 2403-2406, 1999.
Lee et al., Subband adaptive filtering: Theory and implementation, John Wiley & Sons, pp. 106, Jul. 2009.
Nagumo et al., "A Learning Method for System Identification," IEEE Trans. Automat. Contr., vol. AC-12, pp. 282-287,1967.
ITU-T Recommendation P.502: Objective test methods for speech communication systems using complex test signals. ITU-T, 2000.
Benesty et al., "A Fast Exact Least Mean Square Adaptive Algorithm," Signal Processing, vol. 40, No. 12, pp. 2904-2920, 1992.

(Continued)

*Primary Examiner* — Paul Huber
(74) *Attorney, Agent, or Firm* — John W. Branch; Lowe Graham Jones PLLC

(57) ABSTRACT

Embodiments are directed towards providing acoustic echo cancellation in a closely-coupled microphone/speaker system. A speaker may produce an audible signal from a reference signal, which may be captured with a microphone. Full band cancellation (FBC) may modify the captured signal to suppress an echo of the reference signal caused by a direct acoustic path between the microphone and speaker. FBC may include a fixed filter and an adaptive filter. The fixed filter may modify the captured signal based on the reference signal. The adaptive filter may automatically adapt based on the captured signal and the reference signal. If a comparison of a performance of the adaptive filter and the fixed filter is above a threshold, then the fixed filter may be updated based on the adaptive filter. Subband acoustic echo cancellation may generate an output signal that suppresses residual echoes of the reference signal based on the modified signal.

20 Claims, 11 Drawing Sheets

(56) References Cited

OTHER PUBLICATIONS

Gilloire et al., "Adaptive Filtering in Subbands with Critical Sampling: Analysis, Experiments, and Application to Acoustic Echo Cancellation," IEEE Trans. on Signal Processing, vol. 40, No. 8, pp. 1862-1875, 1992.

ITU-T Recommendation P.58, Head and Torso Simulators for Telephonometry, 1993.

* cited by examiner

ACOUSTIC ECHO CANCELLATION (AEC) FOR A CLOSE-COUPLED SPEAKER AND MICROPHONE SYSTEM

TECHNICAL FIELD

The present invention relates generally to acoustic echo cancellation, and more particularly, but not exclusively, to employing a pre-processing of received signals to suppress an echo caused by a close-coupled system.

BACKGROUND

Today, many people use "hands-free" telecommunication systems to talk with one another. These systems often utilize mobile phones, a remote loudspeaker, and a remote microphone to achieve hands-free operation. One aspect of hands-free telecommunication systems is acoustic echo cancellation (AEC). AEC aims to cancel out an echo component along the acoustic path between a loudspeaker and a microphone. Sometimes, frequency domain subband AEC filters may be used to minimize this echo component due to their advantages in reducing computational cost and improving convergence speed. However, when echo power increases, the subband AEC performance typically drops dramatically. In some situations, aliasing can significantly deteriorate the AEC performance if the echo is relatively large. Similarly, if the echo is the dominant signal, it can be difficult to detect the existence of near-end speech, and double talk detection can become less accurate. Since many hands-free devices utilize a remote device where the loudspeaker and microphone are typically close together (i.e., a close-coupled system), the echo power may be relatively large and/or the echo may be the dominant signal captured by the microphone. Thus, it is with respect to these and other considerations that the invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
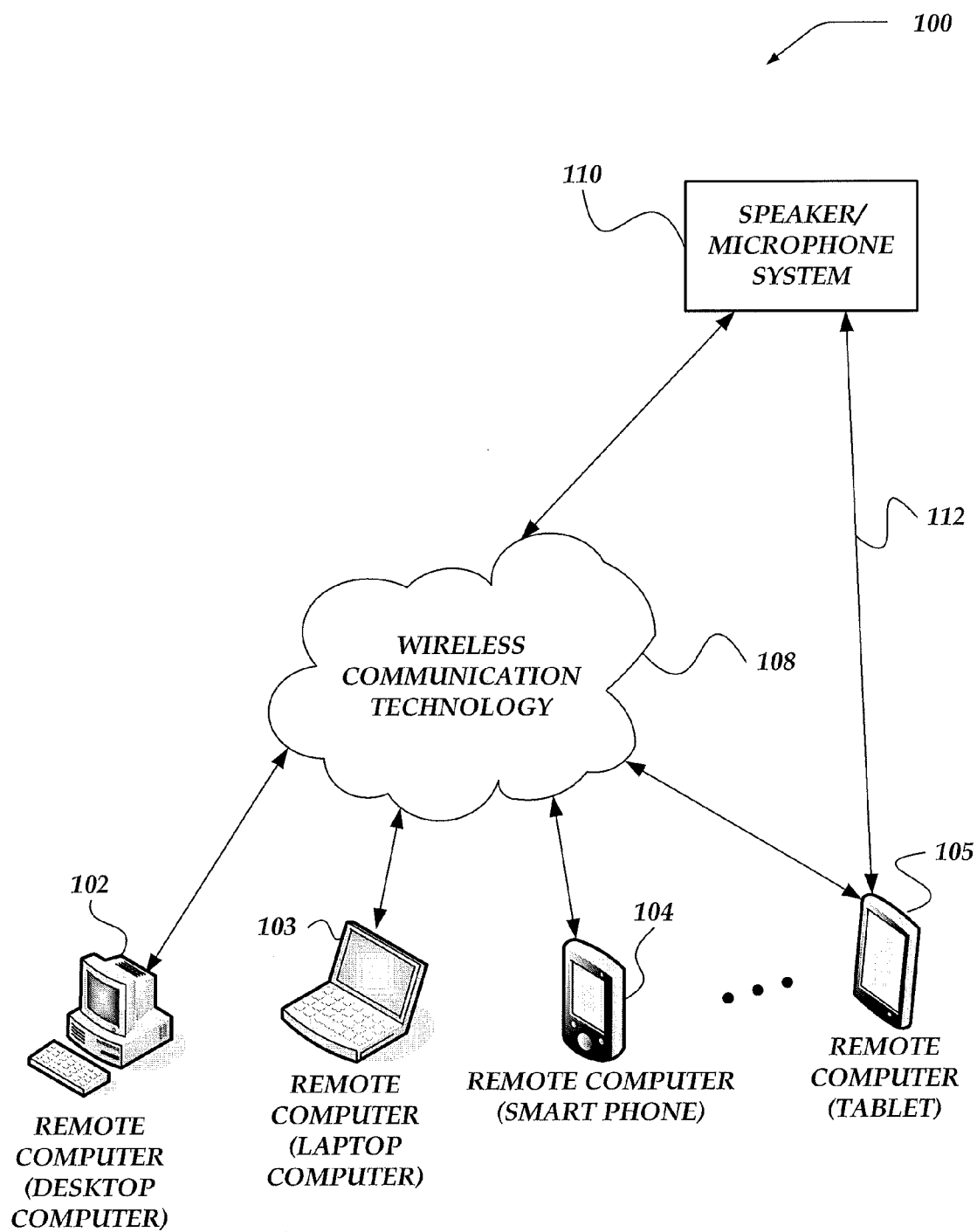
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "full band canceller" or "full band cancellation (FBC) circuit/logic" refers to an acoustic canceller that employs a fixed filter and an adaptive filter as described herein to suppress and/or cancel an acoustic echo caused by a direct acoustic path between a speaker and a microphone. In some embodiments, this direct acoustic echo may be referred to as an initial acoustic signal from the speaker and captured by the microphone before the acoustic signal can reflect off other environmental objects.

As used herein, the term "fixed filter" refers to a filter that may have a static transfer function and unable to self-adapt. Fixed filters typically do not include a feedback loop that can be used to adjust its transfer function. In some embodiments, fixed filters include one or more coefficients that can be utilized to define the transfer function. In comparison, as used herein, the term "adaptive filter" refers to a filter that self-adapts and/or self-adjusts its transfer function according to an optimization algorithm driven by an error or reference signal (e.g., echoes of a reference signal output through a speaker). In some embodiments, adaptive filters include one or more coefficients that can be utilized to define the transfer function. In some embodiments, adaptive filters can adapt to converge its output with the error/reference signal, such that the error/reference signal can be removed, suppressed, or cancelled from a captured signal.

As used herein, the term "close-coupled" or "closely-coupled" refers to a system or device that includes a speaker and a microphone that are in close proximity to each other (e.g., less than three inches apart, but other distances can be imaged), when compared to a location of a user (or near-end speech) to the microphone. In some embodiments, a system may be closely-coupled if a far-end signal to near-end signal ratio (FNR) is relatively large, such as, for example, greater than 10 dB (however, other FNR values may also indicate a close-coupled system).

As used herein, "speaker" may refer to one or more loudspeakers operative to produce an audio or acoustic signals based on a provided reference signal. As used herein, "microphone" may refer to one or more devices operative to capture audio signals.

As used herein, the term "subband acoustic echo cancellation (AEC)" or "subband AEC circuit/logic" refers to a subband acoustic canceller operative to suppress and/or cancel residual acoustic echoes of a signal produced by a speaker from a reference signal. In various embodiments, the residual acoustic echoes may be generated by the signal produced by the speaker reflecting off objects within the environment around the speaker/microphone.

As used herein, the term "far-end receive" or "far-end receive signal" refers to a signal captured or provided by a device or system that is separate, different, or remote from a target speaker/microphone system (e.g., a close-coupled system).

As used herein, the term "far-end send" or "far-end send signal" refers to a signal provided to a speaker in a target speaker/microphone system (e.g., a close-coupled system). In some embodiments, the far-end send signal and the far-end receive signal may be a same signal.

As used herein, the term "near-end receive" or "near-end receive signal" refers to a signal captured by a microphone in a target speaker/microphone system (e.g., a close-coupled system).

As used herein, the term "near-end send" or "near-end send signal" refers to a signal provided from a target speaker/microphone system (e.g., a close-coupled system). In some embodiments, the near-end send signal may be a modified version of the near-end receive signal by embodiments described herein.

As used herein, the term "noise environment" or "environmental noise" refers to ambient noise associated with the speaker/microphone system. In some embodiments, the noise environment may include all noise audible to the user. In other embodiments, the noise environment may include all noise audible to the user except desired sounds produced by the speaker (e.g., the playing of music). The noise environment may also be referred to as background noise and interference other than the desired sounds source.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to providing acoustic echo cancellation of an echo caused by a direct acoustic path between a closely-coupled microphone and speaker. A speaker may be employed to produce an audio signal based on a reference signal. The audio signal may be captured with a microphone. The captured signal may also have other signal components, such as, but not limited to near-end speech, background noise, or the like. Full band cancellation (FBC) logic and/or circuit may be employed to modify the captured signal based on the reference signal. In some embodiments, the modified audio signal may suppress an acoustic echo of the audio signal that is related to at least a direct acoustic path between the microphone and the speaker. Subband acoustic echo cancellation (AEC) logic and/or circuit may be employed to generate an output signal that suppresses residual or other echoes of the audio signal based on the modified signal and the reference signal. In some embodiments, the residual or other echoes may be at least related to an external environment surrounding the microphone and the speaker. In various embodiments, the FBC may be employed and/or performed in the time domain and the subband AEC functions may be employed and/or performed in the frequency domain.

In some embodiments, the FBC logic/circuit may include a fixed filter and an adaptive filter. In some embodiments, the fixed filter may be a finite impulse response fixed filter and the adaptive filter may be a periodic partial update normalized least means square adaptive filter. The fixed filter may be employed to modify the captured signal based on the reference signal. And the adaptive filter may be employed to automatically adapt based on the captured signal and the reference signal to track changes in the direct acoustic path. In some embodiments, the adaptive filter may adapt by updating at least one operating parameter of the adaptive filter to track changes in the direct acoustic path based at least on the captured audio signal and the reference signal.

In various embodiments, a performance (e.g., the echo return loss enhancement (ERLE)) of the fixed filter and of the adaptive filter may be determined. The fixed filter may be updated based on a current configuration of at least one operating parameter of the adaptive filter if a comparison of the performance of the adaptive filter and the performance of the fixed filter is above a threshold. In at least one of various embodiments, a set of coefficients of the fixed filter may be replaced with a current set of coefficients of the adaptive filter if a comparison of an ERLE of the adaptive filter and an ERLE of the fixed filter is above a predetermined threshold.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include speaker/microphone system 110, remote computers 102-105, and wireless communication technology 108.

At least one embodiment of remote computers 102-105 is described in more detail below in conjunction with computer 200 of FIG. 2. Briefly, in some embodiments, remote computers 102-105 may be configured to communicate with speaker/microphone system 110 to enable hands-free telecommunication with other devices, while providing acoustic echo cancellation, as described herein.

In some embodiments, at least some of remote computers 102-105 may operate over a wired and/or wireless network to communicate with other computing devices or speaker/microphone system 110. Generally, remote computers 102-105 may include computing devices capable of communicating over a network to send and/or receive information, perform various online and/or offline activities, or the like. It should be recognized that embodiments described herein are not constrained by the number or type of remote computers employed, and more or fewer remote computers—and/or types of remote computers—than what is illustrated in FIG. 1 may be employed.

Devices that may operate as remote computers 102-105 may include various computing devices that typically connect to a network or other computing device using a wired and/or wireless communications medium. Remote computers may include portable and/or non-portable computers. In some embodiments, remote computers may include client computers, server computers, or the like. Examples of remote computers 102-105 may include, but are not limited to, desktop computers (e.g., remote computer 102), personal computers, multiprocessor systems, microprocessor-based or programmable electronic devices, network PCs, laptop computers (e.g., remote computer 103), smart phones (e.g., remote computer 104), tablet computers (e.g., remote computer 105), cellular telephones, display pagers, radio frequency (RF) devices, infrared (IR) devices, Personal Digital Assistants (PDAs), handheld computers, wearable computing devices, entertainment/home media systems (e.g., televisions, gaming consoles, audio equipment, or the like), household devices (e.g., thermostats, refrigerators, home security systems, or the like), multimedia navigation systems, automotive communications and entertainment systems, integrated devices combining functionality of one or more of the preceding devices, or the like. As such, remote computers 102-105 may include computers with a wide range of capabilities and features.

Remote computers 102-105 may access and/or employ various computing applications to enable users of remote computers to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, remote computers 102-105 may be enabled to connect to a network through a browser, or other web-based application.

Remote computers 102-105 may further be configured to provide information that identifies the remote computer. Such identifying information may include, but is not limited to, a type, capability, configuration, name, or the like, of the remote computer. In at least one embodiment, a remote computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of speaker/microphone system 110 is described in more detail below in conjunction with computer 300 of FIG. 3. Briefly, in some embodiments, speaker/microphone system 110 may a closely-coupled system that may be configured to communicate with one or more of remote computers 102-105 to provide remote, hands-free telecommunication with others, while providing acoustic echo cancellation, as described herein. Examples of speaker/microphone system 110 may include, but are not limited to, Bluetooth soundbar or speaker with phone call support, karaoke machines with internal microphone, home theater systems, mobile phones, or the like.

Remote computers 102-105 may communicate with speaker/microphone system 110 via wired technology 112 and/or wireless communication technology 108. In various embodiments, wired technology 112 may include a cable with a jack for connecting to an audio input/output port on remote devices 102-105 (such a jack may include, but is not limited to a typical headphone jack, a USB connection, or other suitable computer connector).

Wireless communication technology 108 may include virtually any wireless technology for communicating with a remote device, such as, but not limited to Bluetooth, Wi-Fi, or the like. In some embodiments, wireless communication technology 108 may be a network configured to couple network computers with other computing devices, including remote computers 102-105, speaker/microphone system 110, or the like. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks (CANs), Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least remote computers 103-105. Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HS-DPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between remote computers 102-105, speaker/microphone system 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Illustrative Computer

Figure 2:
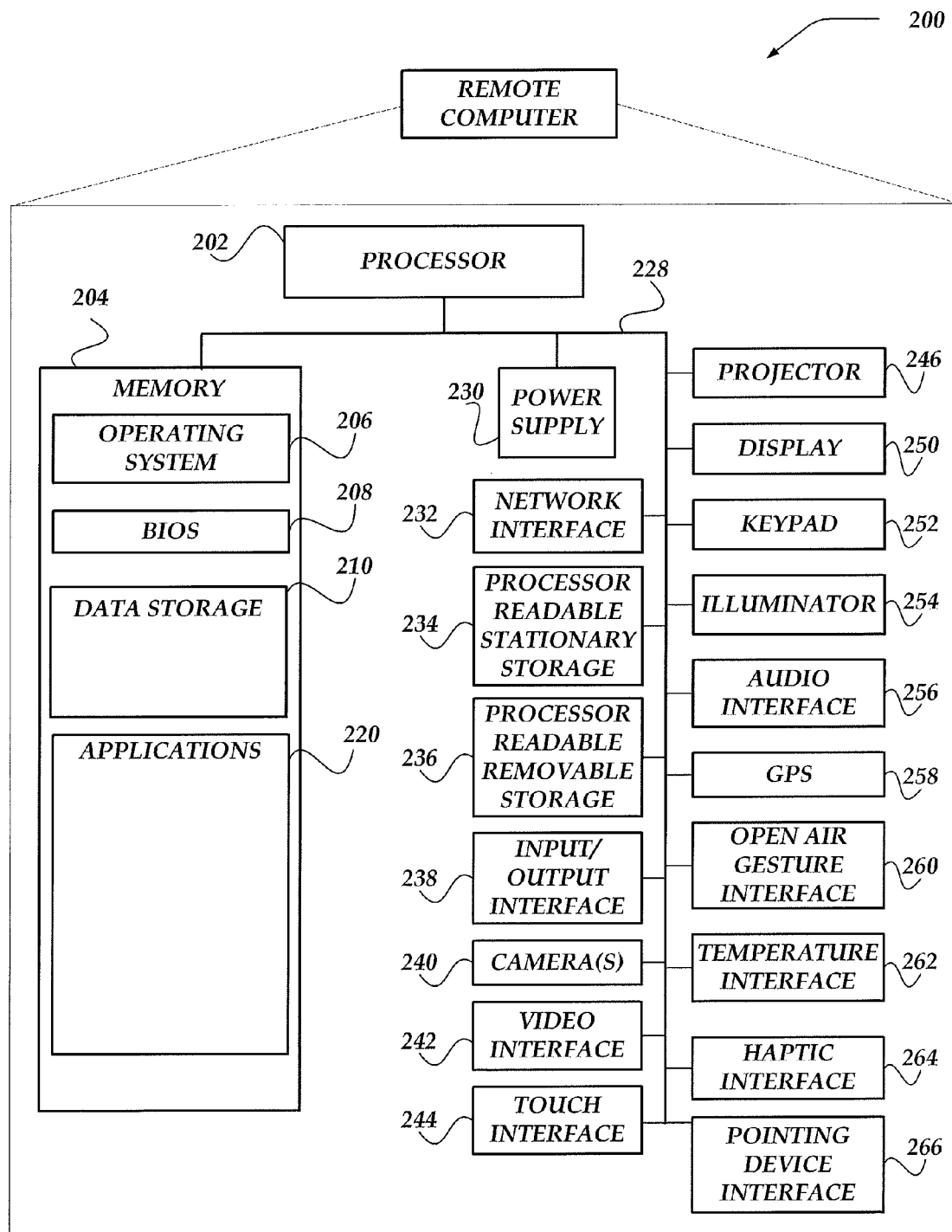
FIG. 2 shows an embodiment of a computer that may be included in a system such as that shown in FIG. 1.

FIG. 2 shows one embodiment of remote computer 200 that may include many more or less components than those shown. Remote computer 200 may represent, for example, at least one embodiment of remote computers 102-105 shown in FIG. 1.

Remote computer 200 may include processor 202 in communication with memory 204 via bus 228. Remote computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Remote computer 200 may optionally communicate with a base station (not shown), or directly with another computer. And in one embodiment, although not shown, a gyroscope may be employed within remote computer 200 to measuring and/or maintaining an orientation of remote computer 200.

Power supply 230 may provide power to remote computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling remote computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of remote computer 200, e.g., using voice recognition, detecting touch based on sound, and the like. In various embodiments the speaker and the microphone may be closely-coupled within the physical housing of remote computer 200 (e.g., the speaker and microphone may be positioned within a few centimeters (e.g., less than five centimeters) of each other within the housing unit of a mobile phone). In some embodiments, audio interface 256 may be operative to reduce, suppress, and/or otherwise cancel echo signals of a reference signal as described herein.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile computer is powered. Also, illuminator 254 may backlight these buttons in various patterns when particular actions are performed, such as dialing another mobile computer. Illuminator 254 may also cause light sources positioned within a transparent or translucent case of the mobile computer to illuminate in response to actions.

Remote computer 200 may also comprise input/output interface 238 for communicating with external peripheral devices or other computers such as other mobile computers and network computers. The peripheral devices may include a remote speaker/microphone system (e.g., device 300 of FIG. 3), headphones, display screen glasses, remote speaker system, or the like. Input/output interface 238 can utilize one or more technologies, such as Universal Serial Bus (USB), Infrared, WiFi, WiMax, Bluetooth™, wired technologies, or the like.

Haptic interface 264 may be arranged to provide tactile feedback to a user of a mobile computer. For example, the haptic interface 264 may be employed to vibrate remote computer 200 in a particular way when another user of a computer is calling. Temperature interface 262 may be used to provide a temperature measurement input and/or a temperature changing output to a user of remote computer 200. Open air gesture interface 260 may sense physical gestures of a user of remote computer 200, for example, by using single or stereo video cameras, radar, a gyroscopic sensor inside a computer held or worn by the user, or the like. Camera 240 may be used to track physical eye movements of a user of remote computer 200.

GPS transceiver 258 can determine the physical coordinates of remote computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of remote computer 200 on the surface of the Earth. It is understood that under different conditions, GPS transceiver 258 can determine a physical location for remote computer 200. In at least one embodiment, however, remote computer 200 may, through other components, provide other information that may be employed to determine a physical location of the mobile computer, including for example, a Media Access Control (MAC) address, IP address, and the like.

Human interface components can be peripheral devices that are physically separate from remote computer 200, allowing for remote input and/or output to remote computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A mobile computer may include a browser application that is configured to receive and to send web pages, web-based messages, graphics, text, multimedia, and the like. The mobile computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of remote computer 200. The memory may also store operating system 206 for controlling the operation of remote computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by remote computer 200 to store, among other things, applications 220 and/or other data. For example, data storage 210 may also be employed to store information that describes various capabilities of remote computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of remote computer 200, including, but not limited to, non-transitory processor-readable removable storage device 236, processor-readable stationary storage device 234, or even external to the mobile computer.

Applications 220 may include computer executable instructions which, when executed by remote computer 200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Speaker/Microphone System

Figure 3:
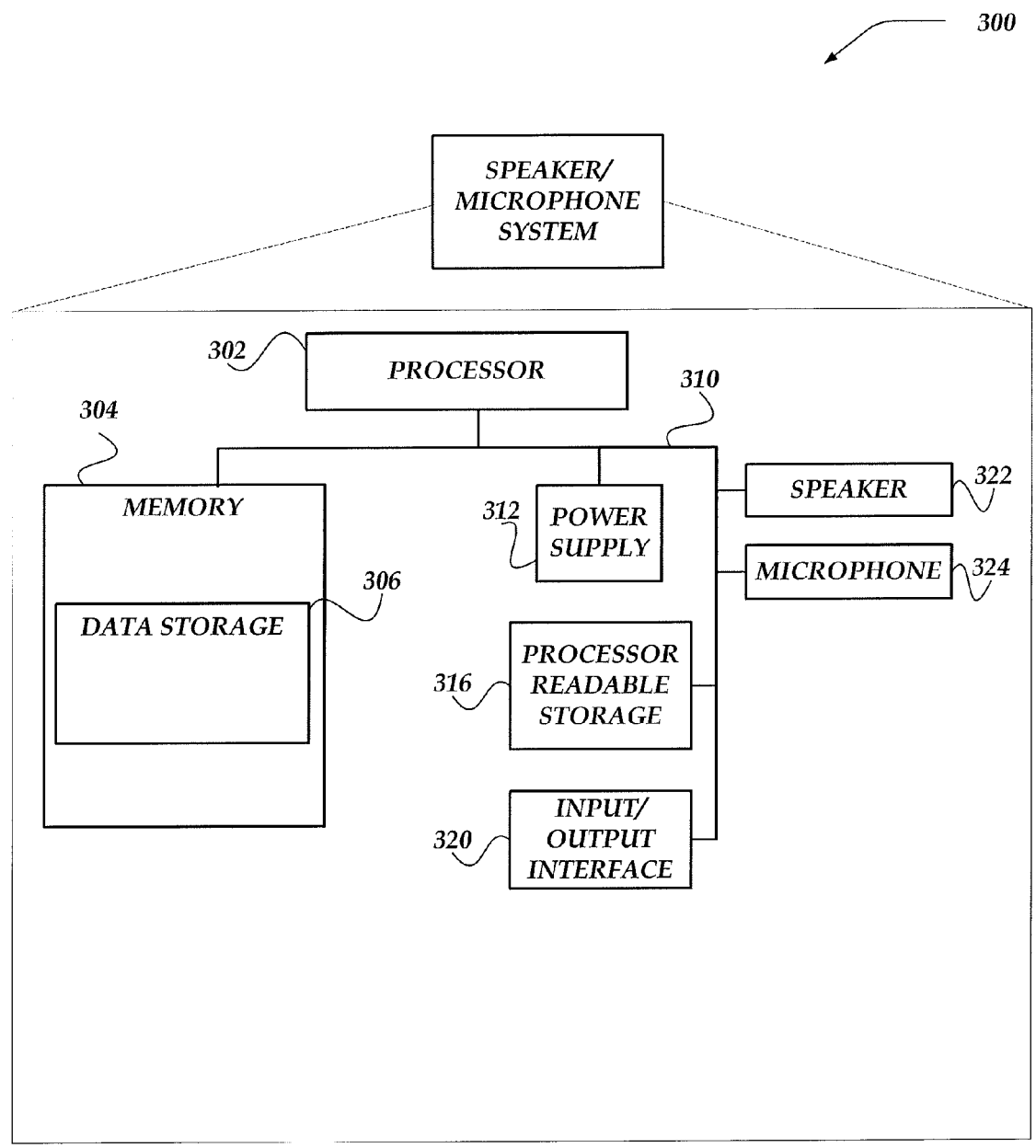
FIG. 3 shows an embodiment of a remote speakerphone that may be including in a system such as that shown in FIG. 1.

FIG. 3 shows one embodiment of close-coupled speaker/microphone system 300 that may include many more or less components than those shown. System 300 may represent, for example, at least one embodiment of close-coupled speaker/microphone system 110 shown in FIG. 1. In various embodiments, system 300 may be remotely located (e.g., physically separate from) to another device, such as remote computer 200 of FIG. 2.

Although close-coupled speaker/microphone system 300 is illustrated as a single device—such as a remote speaker system with hands-free telecommunication capability (e.g., includes a speaker, a microphone, and Bluetooth capability to enable a user to telecommunicate with others)—embodiments are not so limited. For example, in some other embodiments, close-coupled speaker/microphone system 300 may be employed as multiple separate devices, such as a remote speaker system and a separate remote microphone that together may be operative to enable hands-free telecommunication. Although embodiments are primarily described as a smart phone utilizing a remote speaker with microphone system, embodiments are not so limited. Rather, embodiments described herein may be employed in other systems, such as, but not limited to sounds bars with phone call capability, home theater systems with phone call capability, mobile phones with speaker phone capability, or the like.

In any event, system 300 may include processor 302 in communication with memory 304 via bus 310. System 300 may also include power supply 312, input/output interface 320, speaker 322, microphone 324, processor-readable storage device 316. In some embodiments, processor 302 (in conjunction with memory 304) may be employed as a digital signal processor within system 300. So, in some embodiments, system 300 may include speaker 322, microphone 324, and a chip (noting that such as system may include other components, such as a power supply, various interfaces, other circuitry, or the like), where the chip is operative with circuitry, logic, or other components capable of employing embodiments described herein to provide acoustic echo cancellation.

Power supply 312 may provide power to system 300. A rechargeable or non-rechargeable battery may be used to provide power. The power may also be provided by an external power source, such as an AC adapter that supplements and/or recharges the battery.

Speaker 322 may be a loudspeaker or other device operative to convert electrical signals into audible sound. In some embodiments, speaker 322 may include a single loudspeaker, while in other embodiments, speaker 322 may include a plurality of loudspeakers (e.g., if system 300 is implemented as a soundbar).

Microphone 324 may include at least one microphone that is operative to capture audible sound and convert them into electrical signals.

In at least one of various embodiments, speaker 322 in combination with microphone 324 may enable telecommunication with users of other devices. In various embodiments, speaker 322 and microphone 324 may be closely-coupled within the physical housing of system 300.

System 300 may also comprise input/output interface 320 for communicating with other devices or other computers, such as remote computer 200 of FIG. 2, or other mobile/network computers. Input/output interface 320 can utilize one or more technologies, such as Universal Serial Bus (USB), Infrared, WiFi, WiMax, Bluetooth™, wired technologies, or the like.

Although not illustrated, system 300 may also include a network interface, which may operative to couple system 300 to one or more networks, and may be constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Such a network interface is sometimes known as a transceiver, transceiving device, or network interface card (NIC).

Memory 304 may include RAM, ROM, and/or other types of memory. Memory 304 illustrates an example of computer-readable storage media (devices) for storage of information such as computer-readable instructions, data structures, program modules or other data. Memory 304 may further include one or more data storage 306. In some embodiments, data storage 306 may include program code, data, algorithms, and the like, for use by a processor, such as processor 302 to execute and perform actions. In one embodiment, at least some of data storage 306 might also be stored on another component of system 300, including, but not limited to, non-transitory processor-readable storage 316.

Figure 5:
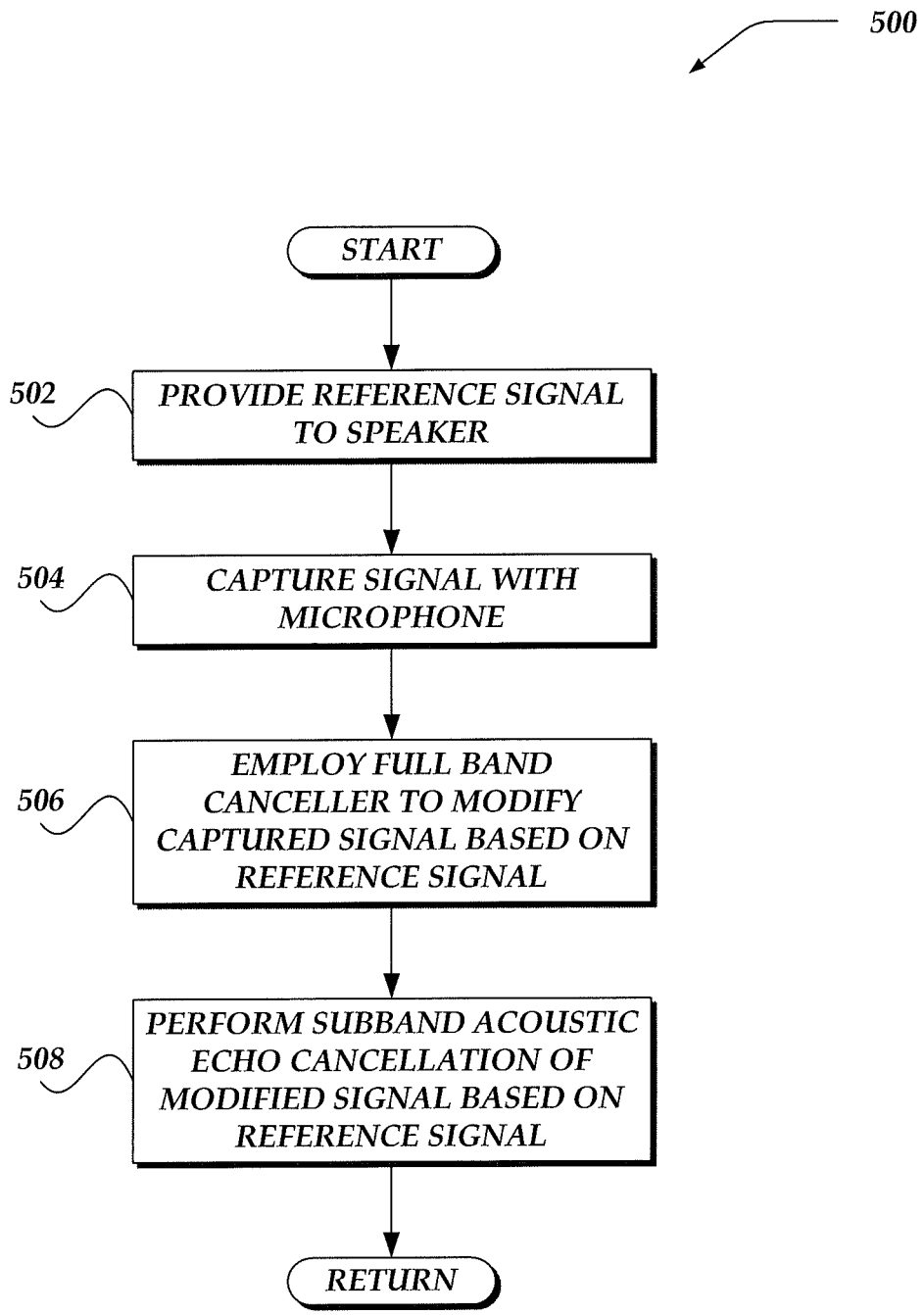
FIG. 5 illustrates a logical flow diagram generally showing one embodiment of an overview process for suppressing echoes of a reference signal in a close-coupled system.
Figure 6:
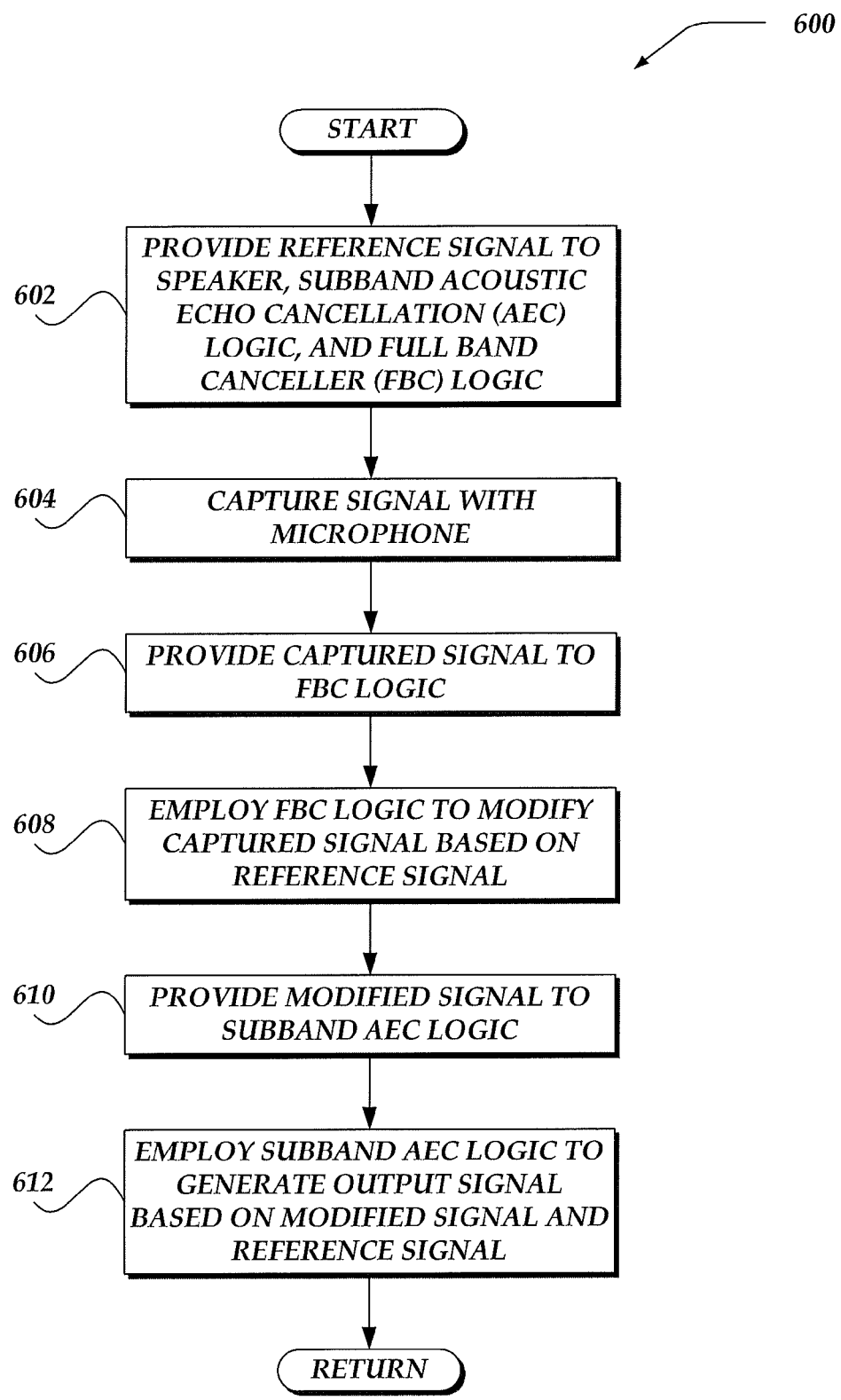
FIG. 6 illustrates a logical flow diagram generally showing one embodiment of a process for employing a full band canceller and subband acoustic echo cancellation to suppress echoes of a reference signal in a close-coupled system.
Figure 7:
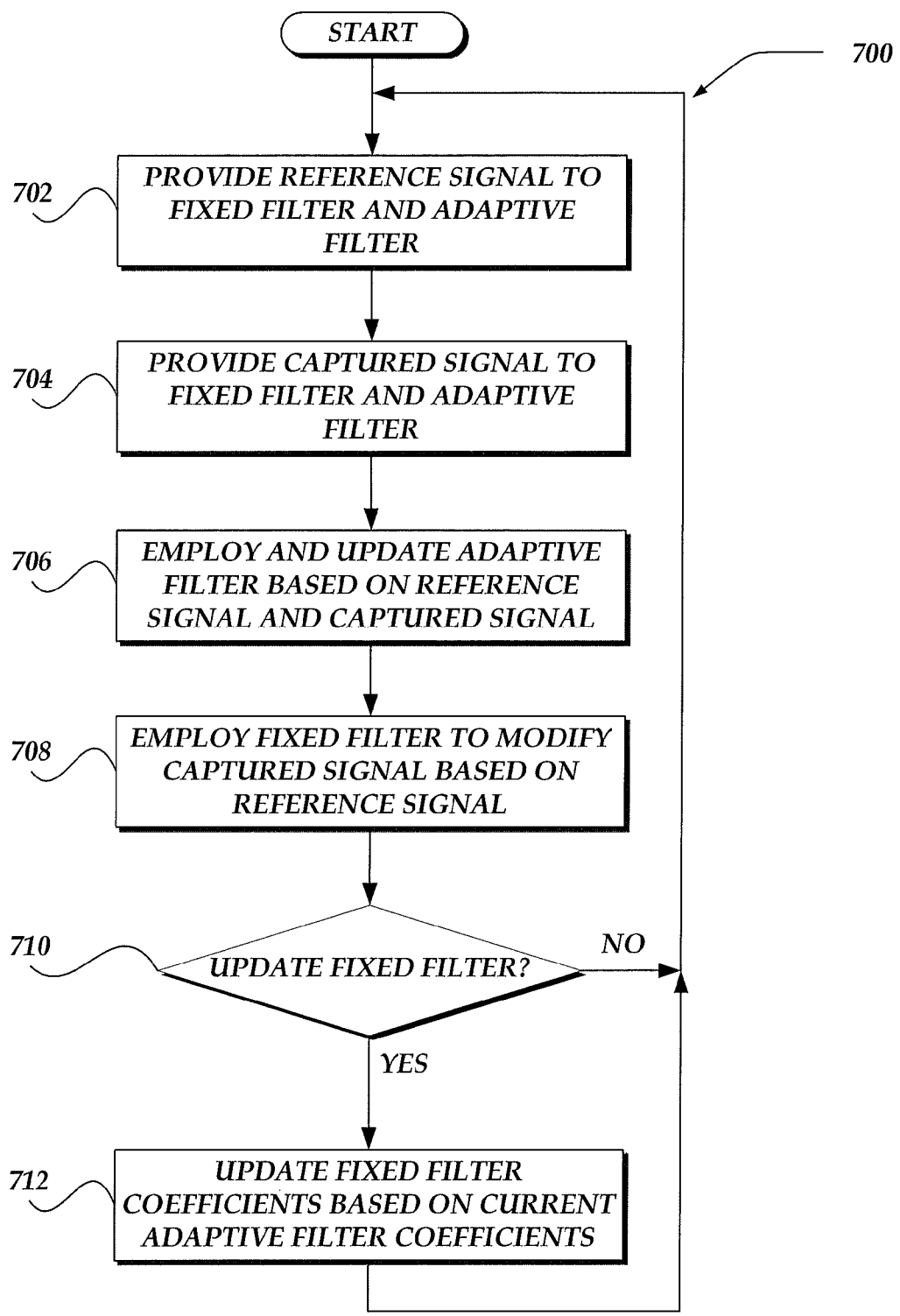
FIG. 7 illustrates a logical flow diagram generally showing an embodiment of a process for employing and modifying a full band canceller.

In some embodiments, hardware components, software components, or a combination thereof of system 300 may employ processes, or part of processes, similar to those described in conjunction with FIGS. 5-7.

Example System Diagram

Figure 4A:
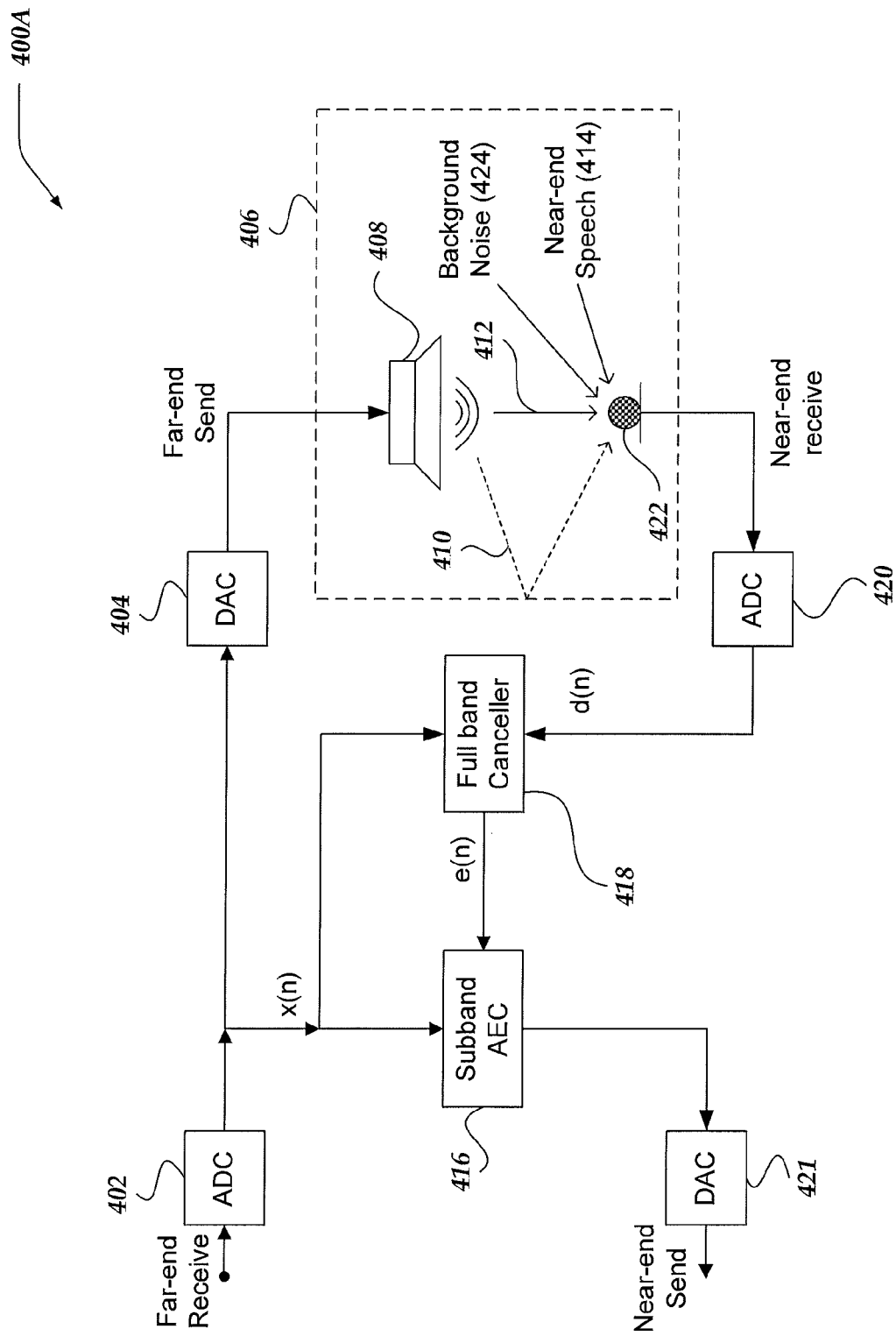
FIGS. 4A and 4B illustrate block diagrams of a system that may be employed to provide acoustic echo cancellation in a close-coupled system.

FIG. 4A illustrates an embodiment of a block diagram of a system that may be employed to provide acoustic echo cancellation in a close-coupled system;

System 400A may include, but is not limited to, subband acoustic echo cancellation (AEC) 416, full band canceller (FBC) 418, analog-to-digital converters (ADC) 402 and 420, digital-to-analog converters (DAC) 404 and 421, speaker 408, and microphone 422. In various embodiments, AEC 416, FBC 418, ADCs 402 and 420, and DACs 404 and 421 may be employed as hardware, software, or a combination of hardware and software within a chip, a network device, or the like. In at least one of various embodiments, at least AEC 416 and/or FBC 418 may be implemented by a digital signal processor, a microcontroller, other hardware chips/circuits, or the like. In some embodiments, AEC 416 and/or FBC 418 may be part a hardware chip that provides signals to speaker 408, receives signals from microphone 422, provides acoustic echo cancellation, provides other signal processing (e.g., noise cancellation functionality), and communicates with a remote computing device, as described herein. In various embodiments, one or more chips may be employed to perform various aspects/functions of embodiments as described herein.

A far-end receive signal may be provided to ADC 402. ADC 402 may convert the far-end signal from an analog signal to a digital signal. In some embodiments, the far-end receive signal may be received as a digital signal, and may not be provided to ADC 402. In at least one of various embodiments, the far-end receive signal may be a signal received at another device, which is transmitted to system 400A. For example, system 400A may be implemented by a first device and the far-end receive signal may be provided by a second device. In this example, the first device may be a wireless-remote speaker/microphone, or other close-coupled system, enabling hands-free telecommunications with a mobile phone. In some embodiments, the second device may be the mobile phone that in communication with the wireless-remote speaker/microphone. In other embodiments, the second device may be a different device, which, for example, may be a second mobile phone that in communication with the hands-free enabled mobile phone.

The output of ADC 402 may be signal x(n), which may also be referred to as the reference signal. Signal x(n) may be provided to subband AEC 416, FBC 418, and DAC 404. DAC 404 may convert signal x(n) from a digital signal into an analog signal. The output of DAC 404 may be the far-end send signal, which may be provided to speaker 408 in environment 406. In some embodiments, the far-end receive signal may be provided to speaker 408 without going through ADC 402 and DAC 404.

Environment 406 may include speaker 408 and microphone 422. Speaker 408 and microphone 422 may be arranged in a closely-coupled system. Such a closely-coupled system may include the speaker and the microphone positioned relative to one another such that the speaker is a distance of a few inches or less away from the microphone. For example, the distance between the speaker and microphone may be between a quarter-of-an-inch apart to two inches apart. However, it should be recognized that the speaker and the microphone may be positioned closer or further apart from each other.

Speaker 408 may employ the far-end send signal to produce audible sound, which may include signal 410 and 412. Signal 412 may be an echo caused by the direct acoustic path between speaker 408 and microphone 422. In some embodiments, signal 412 may be referred to as the direct signal from speaker 408. Signal 410 may be residual echoes caused by the sound generated from speaker 408 bouncing off other objects within environment 406. In some embodiments, environment 406 may include other objects that are not illustrated in FIG. 4A, such as, but not limited to, furniture, walls, people, or the like.

Microphone 422 may capture one or more signals present in environment 406. For example, microphone 422 may capture signals 412 and 410, background noise 424, near-end speech 414, or the like. In various embodiments, near-end speech 414 may be the sound/noise/audio created by one or more users of system 400A. Background noise 424 may include other noise caused by the environment surrounding system 400A, such as for example, driving road noise, wind noise, or the like.

In some embodiments, the signal captured by microphone 422 may be referred to as the near-end receive signal. The near-end receive signal may include multiple noise components, such as signal 412 (echo from the direct acoustic path between the speaker and the microphone), signal 410 (residual environmental echoes of the signal produced by the speaker), background noise 424, near-end speech 414, or the like.

The near-end receive signal may be provided to ADC 420. ADC 420 may convert the near-end receive signal from an analog signal to a digital signal. In various embodiments, the output of ADC 420 may be signal d(n). Signal d(n) may be provided to FBC 418. An embodiment of FBC 418 is illustrated in more detail below in conjunction with FIG. 4B. Briefly, however, FBC 418 may be enabled and/or otherwise operative to suppress and/or cancel signal 412 from signal d(n) in the time domain.

FBC 418 may employ signal x(n) (i.e., the reference signal) and signal d(n) to generate signal e(n), which may be a modified version of signal d(n), as described herein. Signal e(n) may be provided to subband AEC 416. Subband AEC 416 may be enabled and/or otherwise operative to suppress and/or cancel residual environmental echoes (e.g., signal 410) from signal e(n). In some embodiments, subband AEC 416 may be performed by employing embodiments described in U.S. Pat. No. 7,433,463 entitled "Echo Cancellation and Noise Reduction Method," issued Oct. 7, 2008, which is herein incorporated by reference. However, embodiments are not so limited and other methods, system, and/or algorithms may be employed to perform acoustic echo cancellation and/or subband acoustic echo cancellation on signal e(n).

The output signal of subband AEC 416 may be provided to DAC 421. DAC 421 may convert the output signal from subband AEC 416 from a digital signal to an analog signal. The output of DAC 421 may be the near-end send signal. In various embodiments, the near-end send signal may be the signal that may be transmitted to another device (e.g., the mobile phone in communication with system 400A, a separate phone being utilized by a different user, or the like).

In some embodiments, system 400A may include additional components and/or logic not illustrated. For example, in some embodiments, the output of subband AEC (either before or after being provided to DAC 421) may be provided to a non-linear processing component/logic to further attenuate non-linear effects of the acoustic path, a noise cancellation component/logic to remove and/or suppress near-end background noise (e.g., background noise 424), or the like.

Figure 4B:
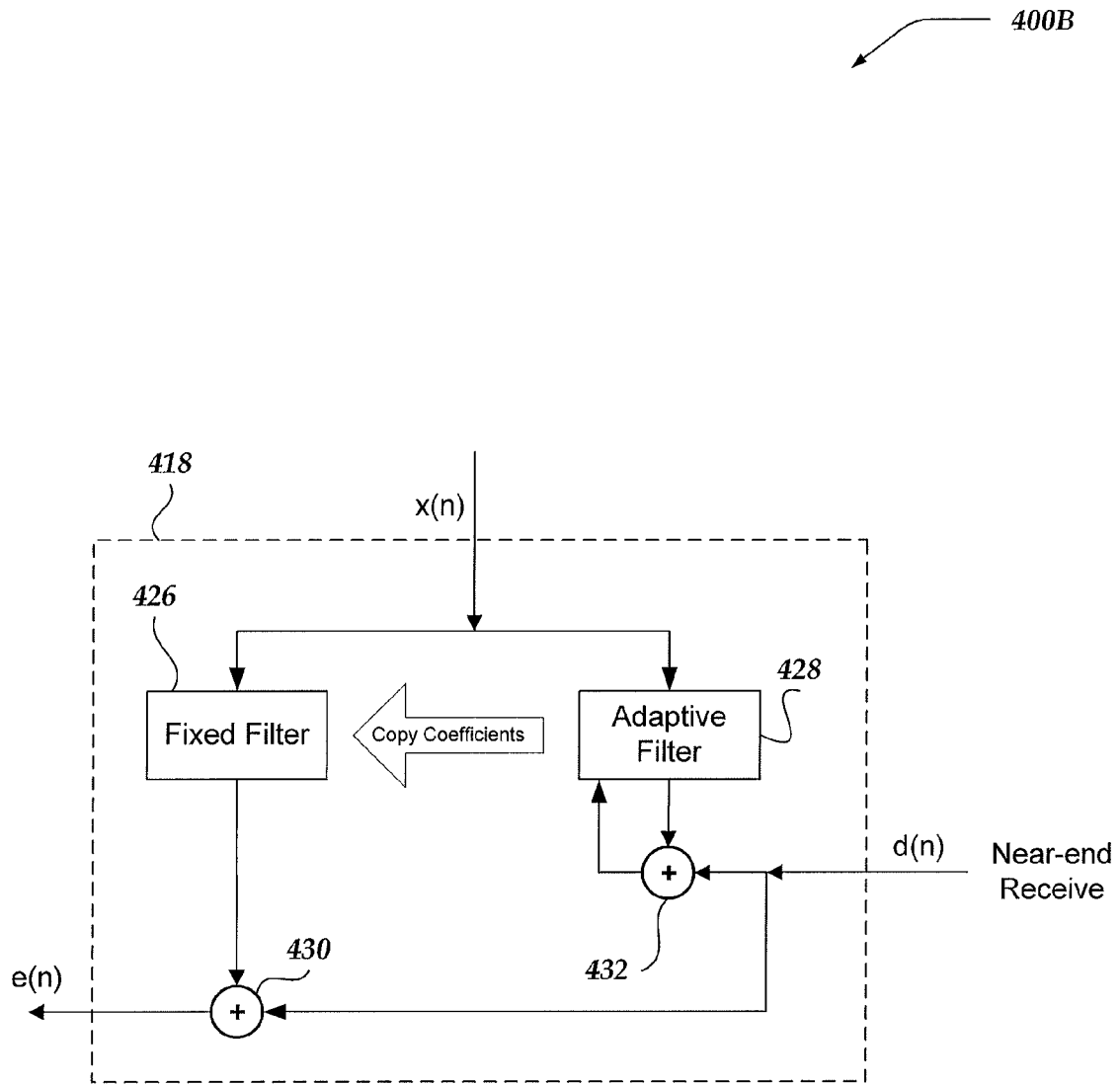

FIG. 4B illustrates an embodiment of a block diagram of a system that may be employed as a full band canceller utilized by system 400A in FIG. 4A. System 400B may be an embodiment of full band canceller (FBC) 418 of FIG. 4A (which is illustrated with the same reference number in FIG. 4B).

FBC 418 may include fixed filer 426 and adaptive filter 428. Signal x(n) may be provided to fixed filter 426 and adaptive filter 428. As described above in conjunction with FIG. 4A, signal x(n) may be a reference signal, which may be a digital signal generated from a far-end receive signal.

Signal d(n) may be a digital signal of the near-end receive signal, such as described above in conjunction with FIG. 4A. Signal d(n) may be provided to summation junction 430 and summation junction 432. In some embodiments, summation junction 430 and/or summation junction 432 may be incorporated with fixed filter 426 and adaptive filter 428, respectively.

Fixed filter 426 may generate an output signal based on signal x(n). In various embodiments, fixed filter 426 may modify signal x(n), such that the fixed filter output signal may be an estimated signal of the acoustic echo (e.g., signal 412 in FIG. 4A) caused by the direct path between a speaker and a microphone (e.g., speaker 408 and microphone 422 in FIG. 4A, respectively). In some embodiments, fixed filter 426 may be a finite impulse response filter, which may utilize one or more coefficients. In some embodiments, the coefficients of fixed filter 426 may be pre-optimized based on laboratory testing of sample environments. In various embodiments, the number of coefficients employed may be based on engineering judgment and/or a desired level of granularity.

The output signal from fixed filter 426 may be provided to summation junction 430. Summation junction 430 may combine signal d(n) and the fixed filter output signal to generate signal e(n) (e.g., the modified signal that is provided to subband AEC 416 in FIG. 4A). In some embodiments, summation junction 430 may be employed to subtract the fixed filter output signal from signal d(n). In other embodiments, fixed filter 426 may invert the signal, such that summation junction 430 may be employed to add the fixed filter output signal to signal d(n).

Adaptive filter 428 may be employed to track changes in the echo path between the speaker and the microphone. In at least one of various embodiments, adaptive filter 428 may track echo path changes by automatically adapting and/or adjusting itself (e.g., the adaptive filter coefficients) based on a comparison of its output signal and signal d(n).

Adaptive filter 428 may generate an output signal based on signal x(n). The adaptive filter output signal may be provided to summation junction 432. In various embodiments, summation junction 432 may subtract (or add, depending on the configuration of adaptive filter 428) the adaptive filter output signal from signal d(n). The output signal from summation junction 432 may be provided back to adaptive filter 428 so that the adaptive filter can utilize this output signal to adapt and/or adjust (e.g., change its own coefficients) and provide more accurate suppression/cancellation of signal x(n) from signal d(n). In various embodiments, adaptive filter 428 may be a periodic partial update normalized least means square (NLMS) adaptive filter. However, embodiments are not so limited and other types of adaptive filters may be employed. In various embodiments, adaptive filter 428 may utilize a same number of coefficients as fixed filter 426, such that the coefficients from adaptive filter 428 may be provided to fixed filter 426, as described herein. In at least one of various embodiments, adaptive filter 428 may be implemented as:

$$w_{n+1} = w_n + \frac{\mu e(n) x_n^*}{x_n^T x_n + \eta}$$

where $$e(n) = d(n) - w_n^T x_n$$

x(n) is the reference signal (e.g., signal x(n) in FIGS. 4A and 4B); d(n) is the microphone signal (e.g., signal d(n) in FIGS. 4A and 4B); $(w_n=[w_1, \ldots, w_N]^T$ is the filter coefficients; $x_n=[x(n), \ldots, x(n-N+1)]^T$ is the reference signal buffer; N is the filter length; μ is the adaptation step size; and η is a small constant to avoid division by zero (which may be based on signal x(n)).

In various embodiments, the coefficients of adaptive filter 428 may be occasionally copied into fixed filter 426. Copying adaptive filter coefficients into the fixed filter may include discarding and/or replacing the previous coefficients of fixed filter 426 with the current coefficients from adaptive filter 428.

In at least one of various embodiments, the coefficients may be copied from adaptive filter 428 to fixed filter 426 if adaptive filter 428 is providing better echo suppression performance than fixed filter 426. In some embodiments, the echo suppression of each filter may be compared to determine which filter is performing better. For example, if the adaptive filter's performance when compared to the fixed filter's performance is above a predetermined threshold, then the adaptive filter coefficients may be copied to the fixed filter. Otherwise, the fixed filter can continue to use its current coefficients, and the adaptive filter can continue to adapt.

In various embodiments, the performance of the filters may be compared based on the echo return loss enhancement (ERLE) of each filter. However, embodiments are not so limited and other methods for comparing the filters performance may be employed. In various embodiments, the ERLE may be determined for fixed filter 426, and the ERLE may be separately determined for adaptive filter 428. The ERLE of a filter may provide a perceived improvement of signal d(n). In at least one of various embodiments, the ERLE improvement of a filter may be recursively computed by:

$$\widehat{ERLE} = (1 - \alpha_{ERLE}) \widehat{ERLE} + \alpha_{ERLE} ERLE(n)$$

where ERLE(n) is the instant ERLE value at nth frame, and $\alpha_{ERLE}$ is a smoothing parameter.

In some embodiments, if a difference between the ERLE improvement of adaptive filter 428 and the ERLE improvement of fixed filter 426 is larger than a predetermined threshold value (e.g., 3 dB), then the coefficients from adaptive filter 428 may be copied to fixed filter 426. In other embodiments, if a ratio of the ERLE improvement of adaptive filter 428 over the ERLE improvement of fixed filter 426 is larger than a predetermined threshold value (e.g., 3 dB), then the coefficients from adaptive filter 428 may be copied to fixed filter 426. However, embodiments are not so limited and other methods for comparing the ERLE improvements of the filters may be employed. It should be recognized that the threshold values may be determined based on engineering judgment, the method used to compare the ERLE improvements of the filters, a step size of the filters, or the like, or a combination thereof.

General Operation

The operation of certain aspects of the invention will now be described with respect to FIGS. 5-7. In at least one of various embodiments, processes 500, 600, and 700 described in conjunction with FIGS. 5-7, respectively, may be implemented by and/or executed on close-coupled speaker/microphone system (e.g., speaker/microphone system 300 of FIG. 3) and/or one or more computers (e.g., computer 200 of FIG. 2). Additionally, various embodiments described herein can be implemented in a system such as system 100 of FIG. 1.

FIG. 5 illustrates a logical flow diagram generally showing one embodiment of an overview process for suppressing echoes of a reference signal in a close-coupled system. Process 500 may begin, after a start block, at block 502, where a reference signal may be provided to a speaker. In various embodiments, the reference signal may be provided by another device. For example, the speaker may be embodied in a portable speaker/microphone system (e.g., system 300 of FIG. 3) that can enable hands-free telecommunication. In some embodiments, the portable speaker/microphone system may communicate with a mobile phone or other computer (e.g., computer 200 of FIG. 2). In at least one such embodiment, the reference signal may be provided to the speaker/microphone system by the mobile phone (e.g., by Bluetooth). In at least one of various embodiments, the reference signal may be an embodiment of signal x(n) of FIGS. 4A and 4B—noting that the reference signal may be converted to analog prior to being provided to the speaker.

Process 500 may proceed to block 504, where a microphone may capture a signal of the environment. This captured signal may include one or more different noise components, including, but not limited to, a direct echo caused by the reference signal, ambient/environmental noise, near-end speech, residual echoes of the reference signal, or the like. In some embodiments, the signal captured by the microphone may be referred to as the near-end receive signal, such as shown in FIG. 4A. In at some embodiments, the captured signal may be converted into a digital signal before being provided to a full band canceller, such that the captured signal may be an embodiment of signal d(n) in FIGS. 4A and 4B.

Process 500 may continue at block 506, where a full band canceller (FBC) may be employed to modify the captured signal based on the reference signal, which is described in more detail below in conjunction with FIG. 7. Briefly, however, the full band canceller may employ a fixed filter with an adaptive filter to reduce, suppress, and/or otherwise cancel an echo (e.g., signal 412 of FIG. 4A) of the reference signal caused by the direct path between the speaker and the microphone. In some embodiments, the FBC may be employed in the time domain, rather than the frequency domain. However, embodiments are not so limited and in some embodiments, the frequency domain may also be employed. In various embodiments, the full band canceller may be an embodiment of FBC 418 of FIGS. 4A and 4B, such that the modified signal may be an embodiment of signal e(n) in FIGS. 4A and 4B.

Process 500 may proceed next to block 508, where subband acoustic echo cancellation (AEC) may be performed on the modified signal based on the reference signal. In at least one of various embodiments, AEC may reduce, suppress, and/or otherwise cancel residual echoes (e.g., signal 410 of FIG. 4A) of the reference signal caused by an environment surrounding the speaker and the microphone. In some embodiments, subband AEC may be employed in the time domain, rather than the frequency domain. However, embodiments are not so limited and in some embodiments, the frequency domain may also be employed. In various embodiments, the subband AEC may be an embodiment of subband AEC 416 of FIG. 4A.

After block 508, process 500 may terminate and/or return to a calling process to perform other actions. In other embodiments, process may not terminate/return but may rather loop (not illustrated) to block 502 to provide continuous acoustic echo cancellation.

FIG. 6 illustrates a logical flow diagram generally showing one embodiment of a process for employing a full band canceller and subband acoustic echo cancellation to suppress echoes of a reference signal in a close-coupled system. Process 600 may begin, after a start block, at block 602, where a reference signal may be provided to a speaker, a subband AEC circuit and/or logic, and FBC circuit and/or logic. Similar to that which is illustrated in FIG. 4A, a digital reference signal (e.g., signal x(n)) may be provided to a subband AEC (e.g, subband AEC 416) and an FBC (e.g., FBC 418). In some embodiments, an analog reference signal may be provided to a speaker (e.g., far-end send signal being provided speaker 408 in FIG. 4A). In various embodiments, block 602 may employ embodiments of block 502 of FIG. 5 to provide the reference signal to the speaker.

Process 600 may proceed to block 604, where a signal may be captured by a microphone. In at least one of various embodiments, block 604 may employ embodiments of block 504 of FIG. 5 to capture a signal with the microphone.

Process 600 may continue at block 606, where the captured signal may be provided to the FBC circuit/logic. In some embodiments, the captured signal may be converted from analog to digital (e.g., by an ADC) prior to being provided to the FBC circuit/logic. This captured digital signal may be illustrated in FIG. 4A as signal d(n).

Process 600 may proceed next to block 608, where the FBC circuit/logic may be employed to modify the captured signal based on the reference signal, which is described in more detail below in conjunction with FIG. 7. Briefly, however, a fixed filter may be employed to modify the captured signal (e.g., signal d(n)) based on the reference signal (e.g., signal x(n)), while an adaptive filter may be employed to track the direct echo path, such that changes in the direct echo path may be utilized to update the fixed filter. In various embodiments, the output of the FBC circuit/logic may be a modified signal, such as signal e(n) of FIG. 4A. In some embodiments, block 608 may employ embodiments of block 506.

Process 600 may continue next at block 610, where the modified signal may be provided to the subband AEC circuit/logic. In some embodiments, the modified signal may be an embodiment of signal e(n) in FIGS. 4A and 4B.

Process 600 may proceed to block 612, where the subband AEC circuit/logic may be employed to generate an output signal based on the modified signal (e.g., signal e(n)) and the reference signal (e.g., signal x(n)). In at least one of various embodiments, block 612 may employ embodiments of block 508 to perform subband AEC on the modified signal.

After block 612, process 600 may terminate and/or return to a calling process to perform other actions. In other embodiments, process 600 may not terminate/return but may rather loop (not illustrated) to block 602 to provide continuous acoustic echo cancellation.

FIG. 7 illustrates a logical flow diagram generally showing an embodiment of a process for employing and modifying a full band canceller. Process 700 may begin, after a start block, at block 702, where a reference signal may be provided to a fixed filter and to an adaptive filter of the full band canceller (FBC). In some embodiments, the reference signal may be an embodiment signal x(n) of FIG. 4B. Similarly, the FBC, fixed filter, and adaptive filter may be embodiments of FBC 418, fixed filter 426, and adaptive filter 428, respectively, of FIG. 4B.

Process 700 may proceed to block 704, where a signal captured by a microphone may be provided to the fixed filter and to the adaptive filter. In at least one of various embodiments, the captured signal may be an embodiment of signal d(n) in FIG. 4B. In some embodiments, the captured signal may not be provided directly to the fixed filter, but may rather be provided to a summation junction (e.g., summation junction 430 of FIG. 4B) that can combine an output of the fixed filter with the captured signal. Similarly, in other embodiments, the captured signal may not be provided directly to the adaptive filter, but may rather be provided to a different summation junction (e.g., summation junction 432 of FIG. 4B) that can combine an output of the adaptive filter with the captured signal. In various embodiments, the fixed filter and the adaptive filter may be operative to utilize a same number of time domain samples (e.g., 20) of the captured signal. In at least one embodiment, the fixed filter and the adaptive filter may utilize a same number of operating parameters (e.g., same number of coefficients).

Process 700 may continue at block 706, where the adaptive filter may be employed and updated based on the reference signal and the captured signal. As described herein, the adaptive filter may utilize one or more coefficients to generate an output signal based on the reference signal in the time domain. This output signal may be combined with the captured signal, and the combined signal may be utilized by the adaptive filter to update and/or otherwise adjust the coefficients of the adaptive filter. In various embodiments, the adaptive filter may continually update/adapt in near real-time based on the reference signal and the captured signal.

Process 700 may proceed next at block 708, where the fixed filter may be employed to modify the captured signal based on the reference signal. As described herein, the adaptive filter may utilize one or more coefficients to generate an output signal based on the reference signal in the time domain. This output signal may be combined with the captured signal, and the combined signal may be the modified captured signal that may be provided to a subband AEC (e.g., subband AEC 416 of FIG. 4A) for further suppression of residual echoes of the reference signal.

Process 700 may continue next at decision block 710, where a determination may be made whether or not to update the fixed filter. In various embodiments, the performance of the fixed filter may be compared to the performance of the adaptive filter to determine if the fixed filter should be updated. In at least one of various embodiments, if the performance of the adaptive filter, compared to the performance of the fixed filter, is above a threshold value, then the fixed filter may be updated. In various embodiments, an ERLE may be determined for each filter and then compared, which is described in more detail above. If the fixed filter may be updated, then process 700 may flow to block 712; otherwise, process 700 may loop to block 702 to continue to provide acoustic echo cancellation.

At block 712, the coefficients of the fixed filter may be updated based on the current coefficients of the adaptive filter. In various embodiments, at least one operating parameter of the fixed filter may be updated based on at least one other operating parameter of the adaptive filter. In some embodiments, a memory associated with the fixed filter may be updated to remove and/or otherwise discard the previous coefficients of the fixed filter and may be replaced with the current coefficients of the adaptive filter.

After block 712, process 700 may loop to block 702 to provide continuous acoustic echo cancellation.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Example

Figure 8:
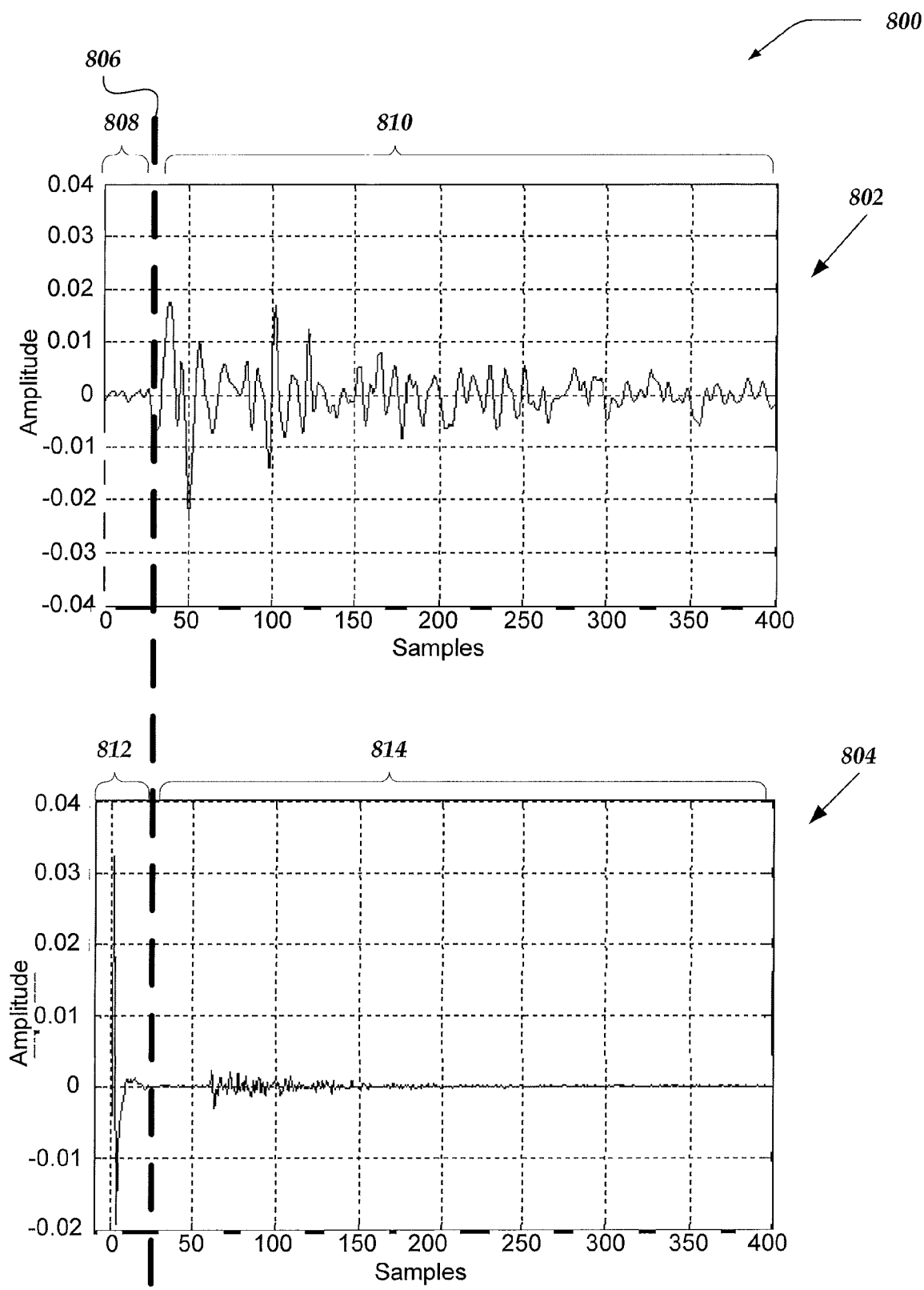
FIG. 8 shows a use case illustration of a comparison of echo acoustic path impulse responses of different environments.

FIG. 8 shows a use case illustration of a comparison of echo acoustic path impulse responses of different environments. Example 200 includes graph 802 and graph 804. Graph 802 may be an example illustration of an acoustic echo path impulse response within an automobile. And graph 802 may be an example illustration of an acoustic echo path impulse response of a close-coupled speaker/microphone device. In each graph, an impulse may be projected from a speaker and an acoustic echo response may be captured by a microphone.

In some automobile hands-free enabled telecommunication systems, the speaker may be located in a door panel or some other location that may be many feet (e.g., four or five feet, although other distances are conceivable) away from the microphone, which may be positioned close to where the driver is seated. It should be recognized that multiple speakers may be employed in a hands-free system, but for simplicity, the description may refer to a single speaker—noting that embodiments described herein may also be employed in multi-speaker configurations and systems.

In example 800, sections 808 and 812 may represent an initial acoustic echo caused by a direct path between the speaker and the microphone. And sections 810 and 814 may represent residual acoustic echoes caused by the environment surrounding the speaker and the microphone.

For graph 802, the impulse response may be illustrated as signal $q_a(n)$. As illustrated by section 808 there may be very little echo. This may be because the impulse signal has not yet reached the microphone (i.e., section 808 may represent the distance between the automobile speaker and the automobile microphone). By the time the sound wave generated by the speaker reaches the microphone at line 806, its residual acoustic echoes reflecting and/or bouncing off the interior of the automobile may hit the microphone, which may be illustrated by section 810.

For graph 804, the impulse response may be illustrated as signal $q_s(n)$. As illustrated by section 812 a dominant amount of echo caused by the initial samples of $q_s(n)$ may reach the microphone. This initial spike or impulse may be caused by the direct acoustic echo path between the speaker and the microphone. And section 814 may illustrate the residual acoustic echoes of the impulse as it reflects off objects within environment surrounding the close-coupled speaker/microphone device.

By employing embodiments described herein (e.g., by employing FBC 418 of FIG. 4A) the impulse illustrated in section 812 may be eliminated or reduced, such that additional AEC methods and/or algorithms (e.g., subband AEC 416 of FIG. 4A) may be employed to reduce and/or cancel the residual echoes illustrated in sections 810 and 814.

FIGS. 9A-9D show use case illustrations of full band canceller performance.

Figure 9A:
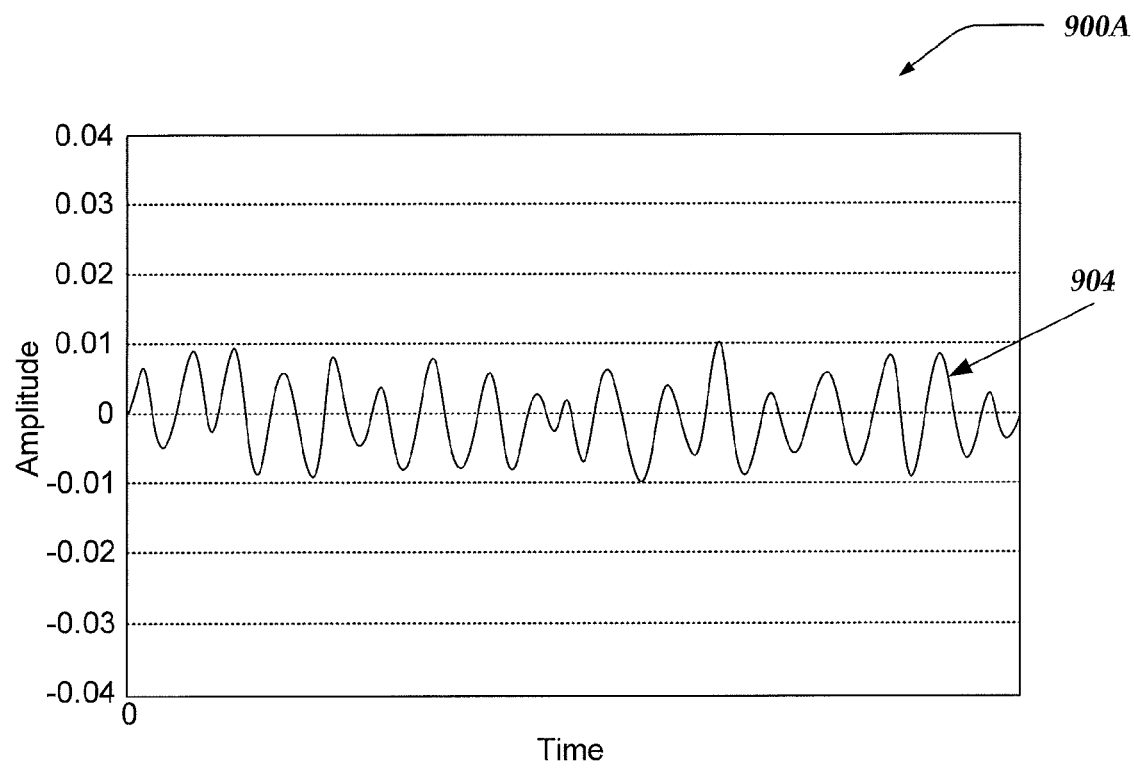
FIGS. 9A-9D show use case illustrations of full band canceller performance.

Example 900A of FIG. 9A may illustrate signal 904. Signal 904 may be a waveform of a near-end speech signal, such as, for example, speech from a user of a close-coupled speaker/microphone device or system (e.g., system 300 of FIG. 3). In some embodiments, example 900A may illustrate near-end speech, but not a far-end send signal (i.e., signals and/or echoes generated from the speaker, which may also be referred to as far-end speech). In at least one of various embodiments, signal 904 may be an embodiment of near-end speech 414 of FIG. 4A, but may not include signals 410 or 412 of FIG. 4A and/or background noise 424 of FIG. 4A.

Figure 9B:
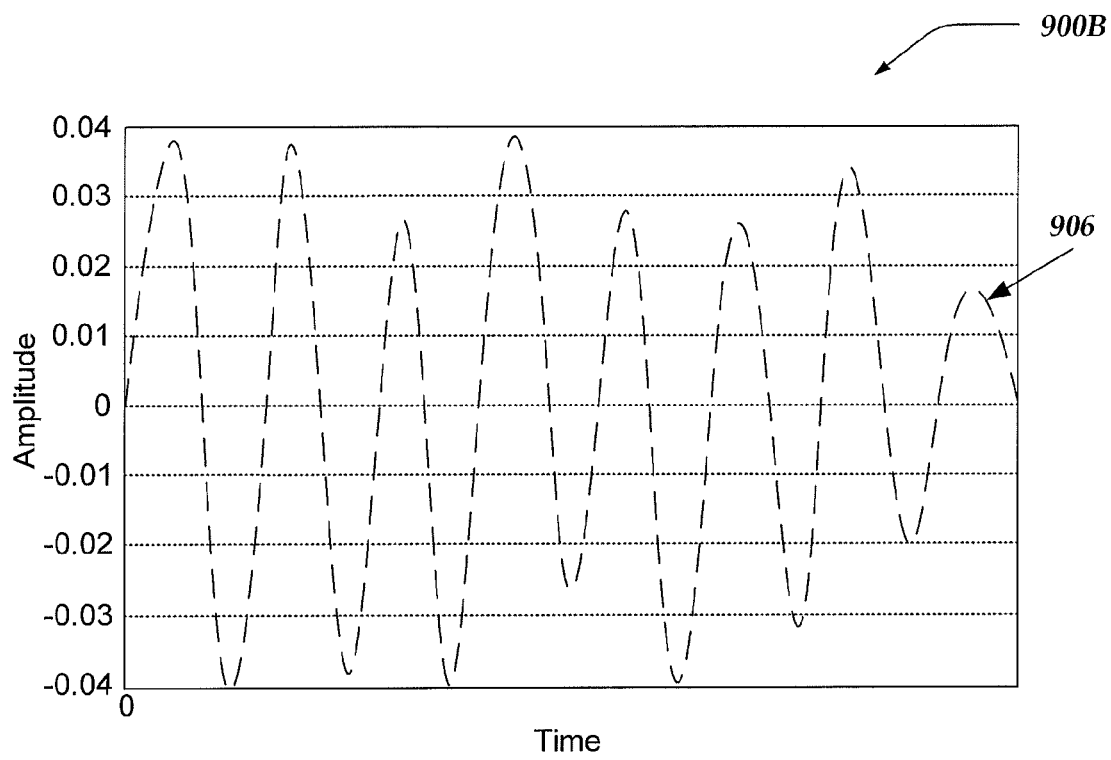

Example 900B of FIG. 9B may illustrate signal 906. Signal 906 may illustrate an initial echo caused by the direct acoustic path between the speaker and the microphone in the close-coupled system. In some embodiments, example 900B may illustrate far-end send signal (i.e., the acoustic echo caused by the direct acoustic path, but not a near-end receive signal (i.e., speech from a user of a close-coupled system) or environmental background noise. In at least one of various embodiments, signal 906 may be an embodiment of signal 412 of FIG. 4A, but may not include near-end speech 414, signal 410, and/or background noise 424, of FIG. 4A.

Figure 9C:
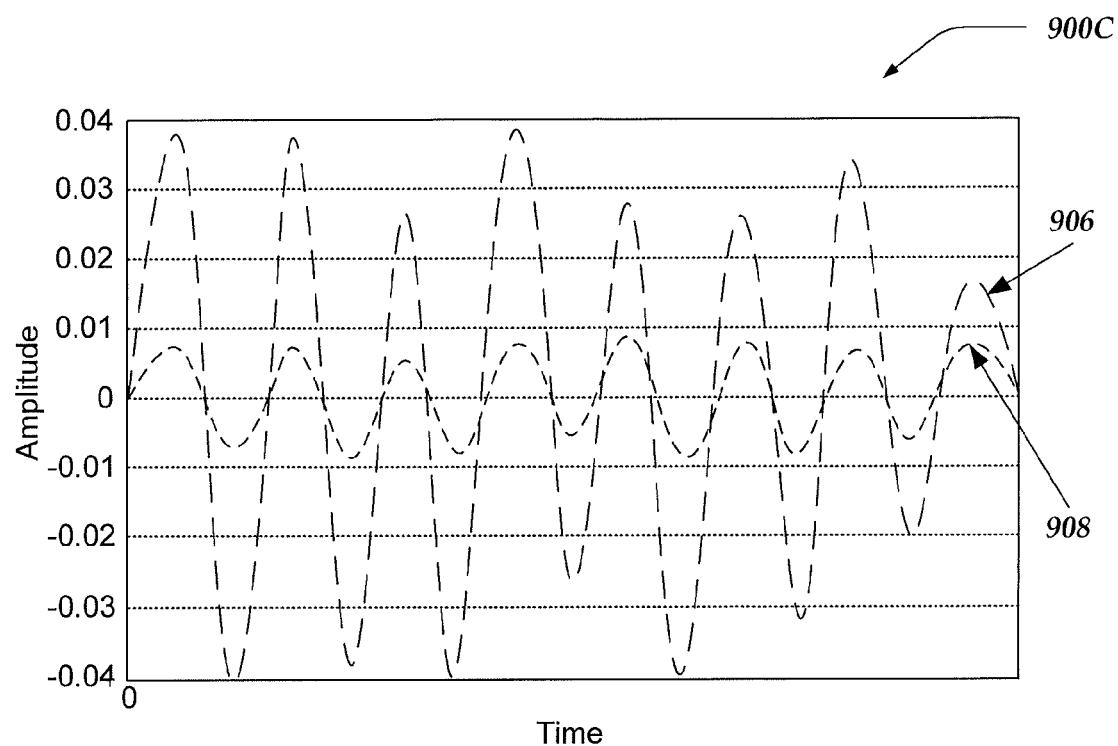

Example 900C of FIG. 9C may illustrate signals 906 and 908. Signal 906 may be an embodiment of signal 906 in FIG. 9B illustrating an initial echo caused by the direct acoustic path between the speaker and the microphone in the close-coupled system (e.g., signal 412 of FIG. 4A). By employing embodiments described herein, signal 908 may be generated, which may be an embodiment of signal e(n) in FIG. 4A.

Figure 9D:
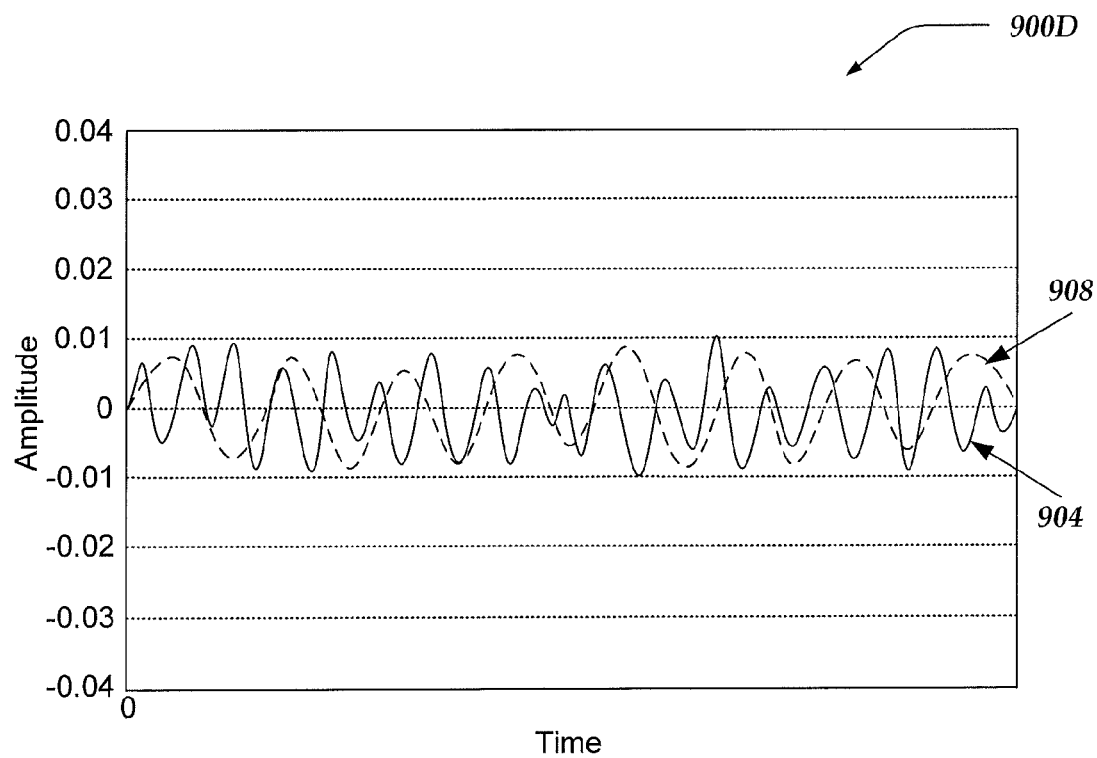

Example 900D of FIG. 9D may illustrate signals 908 and 904. Signal 908 may be an embodiment of signal 908 in FIG. 9C illustrating the initial echo after FBC processing, as described herein. And signal 904 may be an embodiment of signal 904 in FIG. 9A illustrating the near-end speech. As illustrated, signal 908 and signal 904 may have similar amplitudes, which may enable more efficient use of AEC components and/or systems (e.g., subband AEC 416 of FIG. 4A). By employing embodiments described herein, full duplex capability can be utilized in close-coupled systems for higher FNR (far-end signal to near-end signal ratio), rather than traditional methods that may provide poor acoustic echo cancellation or perform as a half duplex system for higher FNR.

The above specification, examples, and data provide a complete description of the manufacture and use of the composition of the invention. Since many embodiments can be made without departing from the spirit and scope of the invention, the invention resides in the claims hereinafter appended.

What is claimed is:

1. A method for providing acoustic echo cancellation, comprising:
   employing a speaker to produce an audio signal from a reference signal;
   capturing the audio signal with a microphone, wherein the microphone is closely-coupled to the speaker;
   employing full band cancellation (FBC) logic to modify the captured audio signal based on the reference signal, wherein the modified audio signal suppresses an acoustic echo of the audio signal that is related to at least a direct acoustic path between the microphone and the speaker; and employing subband acoustic echo cancellation (AEC) logic to generate an output signal that suppresses other echoes of the audio signal based on the modified audio signal and the reference signal, wherein the other echoes are at least related to an external environment surrounding the microphone and the speaker.

2. The method of claim 1, wherein the FBC logic is employed in time domain and the subband AEC logic is employed in the frequency domain.

3. The method of claim 1, wherein employing the FBC logic further comprises:
employing a fixed filter to modify the captured audio signal based on the reference signal; and
employing an adaptive filter that automatically updates at least one operating parameter of the adaptive filter to track changes in the direct acoustic path based at least on the captured audio signal and the reference signal.

4. The method of claim 1, wherein employing the FBC logic further comprises:
employing a fixed filter and an adaptive filter that are both employed in the time domain, and
updating at least one operating parameter of the fixed filter based on at least one other operating parameter of the adaptive filter if a change in the direct acoustic path is detected.

5. The method of claim 1, further comprising:
determining a performance for each of a fixed filter of the FBC logic and an adaptive filter of the FBC logic; and
if a comparison of the performance of the adaptive filter and the performance of the fixed filter is above a threshold, updating the fixed filter based on a current configuration of at least one operating parameter of the adaptive filter.

6. The method of claim 1, further comprising:
determining an echo return loss enhancement (ERLE) for each of a fixed filter of the FBC logic and an adaptive filter of the FBC logic; and
if a comparison of the ERLE of the adaptive filter and the ERLE of the fixed filter is above a predetermined threshold, replacing a set of coefficients of the fixed filter with a current set of operating parameters of the adaptive filter.

7. The method of claim 1, wherein the FBC logic includes a finite impulse response fixed filter and a periodic partial update normalized least means square adaptive filter.

8. A hardware chip that is operative to provide acoustic echo cancellation for a speaker and microphone system, comprising:
a full band cancellation (FBC) logic that is operative to modify a captured audio signal from a microphone based on a reference signal, wherein the captured audio signal is based on an audio signal produced from the reference signal by a speaker that is closely-coupled to the microphone, and wherein the modified audio signal suppresses an acoustic echo of the audio signal that is related to at least a direct acoustic path between the microphone and the speaker; and
a subband acoustic echo cancellation (AEC) logic that is operative to generate an output signal that suppresses other echoes of the audio signal based on the modified audio signal and the reference signal, wherein the other echoes are at least related to an external environment surrounding the microphone and the speaker.

9. The hardware chip of claim 8, wherein the FBC logic is employed in time domain and the subband AEC logic is employed in the frequency domain.

10. The hardware chip of claim 8, wherein the FBC logic further comprises:
a fixed filter to modify the captured audio signal based on the reference signal; and
an adaptive filter that automatically updates at least one operating parameter of the adaptive filter to track changes in the direct acoustic path based at least on the captured audio signal and the reference signal.

11. The hardware chip of claim 8, wherein the FBC logic is further operative to determine a performance for each of a fixed filter of the FBC logic and an adaptive filter of the FBC logic, and if a comparison of the performance of the adaptive filter and the performance of the fixed filter is above a threshold, update the fixed filter based on a current configuration of at least one operating parameter of the adaptive filter.

12. The hardware chip of claim 8, wherein the FBC logic is further operative to determine an echo return loss enhancement (ERLE) for each of a fixed filter of the FBC logic and an adaptive filter of the FBC logic, and if a comparison of the ERLE of the adaptive filter and the ERLE of the fixed filter is above a predetermined threshold, replace a set of coefficients of the fixed filter with a current set of operating parameters of the adaptive filter.

13. The hardware chip of claim 8, wherein the FBC logic includes a finite impulse response fixed filter and a periodic partial update normalized least means square adaptive filter.

14. An apparatus for providing acoustic echo cancellation, comprising:
a transceiver that is operative to communicate with a remote computer;
a speaker that is operative to produce an audio signal from a reference signal;
a microphone that is operative to capture the audio signal, wherein the microphone is closely-coupled to the speaker, and wherein the microphone and the speaker enable phone call support with the remote computer; and
a processor that is operative to execute instructions that enable actions, including:
employing full band cancellation (FBC) logic to modify the captured audio signal based on the reference signal, wherein the modified audio signal suppresses an acoustic echo of the audio signal that is related to at least a direct acoustic path between the microphone and the speaker; and
employing subband acoustic echo cancellation (AEC) logic to generate an output signal that suppresses other echoes of the audio signal based on the modified audio signal and the reference signal, wherein the other echoes are at least related to an external environment surrounding the microphone and the speaker.

15. The apparatus of claim 14, wherein the FBC logic is employed in time domain and the subband AEC logic is employed in the frequency domain.

16. The apparatus of claim 14, wherein employing the FBC logic further comprises:
employing a fixed filter to modify the captured audio signal based on the reference signal; and
employing an adaptive filter that automatically updates at least one operating parameter of the adaptive filter to track changes in the direct acoustic path based at least on the captured audio signal and the reference signal.

17. The apparatus of claim 14, wherein employing the FBC logic further comprises:

employing a fixed filter and an adaptive filter that are both employed in the time domain, and updating at least one operating parameter of the fixed filter based on at least one other operating parameter of the adaptive filter if a change in the direct acoustic path is detected.

18. The apparatus of claim 14, wherein the processor is operative to execute instructions that enable further actions, comprising:

determining a performance for each of a fixed filter of the FBC logic and an adaptive filter of the FBC logic; and if a comparison of the performance of the adaptive filter and the performance of the fixed filter is above a threshold, updating the fixed filter based on a current configuration of at least one operating parameter of the adaptive filter.

19. The apparatus of claim 14, further comprising:

determining an echo return loss enhancement (ERLE) for each of a fixed filter of the FBC logic and an adaptive filter of the FBC logic; and if a comparison of the ERLE of the adaptive filter and the ERLE of the fixed filter is above a predetermined threshold, replacing a set of coefficients of the fixed filter with a current set of operating parameters of the adaptive filter.

20. The apparatus of claim 14, wherein the FBC logic includes a finite impulse response fixed filter and a periodic partial update normalized least means square adaptive filter.

\* \* \* \* \*